Patented June 25, 1946

2,402,668

UNITED STATES PATENT OFFICE 2,402,668

PURIFICATION OF ALUMINUM SULPHATE

Paul S. Roller, Cheverly, Md.

No Drawing. Application April 24, 1942,
Serial No. 440,395

13 Claims. (Cl. 23—123)

The present invention relates to the purification of aluminous materials, particularly from iron, and it especially relates to the treatment of bauxite, clay and other aluminous minerals to produce aluminum sulphate therefrom substantially devoid of iron, which aluminum sulphate may then be used for providing relatively pure alumina.

An alkaline process consisting of digesting bauxite ore with caustic soda under pressure, for obtaining alumina from bauxite requires a high grade, expensive, relatively scarce ore, low in silica, and it cannot be readily used with low grade bauxites or clays.

Acid processes consisting of digesting aluminous minerals with mineral acids are not suitable for these abundant aluminous minerals because of the difficulty of eliminating the iron.

It is among the objects of the present invention to provide a process of purifying aluminous materials containing iron and other impurities to produce aluminum sulphate therefrom relatively low in iron, which may then be used for producing relatively pure alumina.

It is among the further objects of the present invention to provide an acid process of treating clay, bauxite and other aluminous minerals to produce relatively pure aluminum sulphate therefrom at low cost and in a relatively high state of purity.

In accomplishing the above objects it has been found that aluminum sulphate solutions containing iron sulphate such as may be produced by digesting clay, bauxite, or other aluminous materials with sulphuric acid, may be treated with a water miscible, organic liquid in the presence of sulphuric acid so that the aluminum sulphate is precipitated in a relatively high state of purity as the normal salt, containing in the air dried state usually about 16 mols. of water, leaving the bulk of the iron and other impurities dissolved in the mother liquor, and may be further purified by redissolving the aluminum sulphate and repeating the process.

Water miscible, organic liquids such as methyl, ethyl or isopropyl alcohol, acetone, methyl acetone, acetol, glacial acetic acid, propionic acid, ethylene glycol, ethers of ethylene glycol, diacetone alcohol, ethylene chlorohydrin, 1,4-dioxane, propylene glycol, acetonylacetone, etc., suitable for precipitating aluminum sulphate from its solution. It is preferred that the organic liquids be inert in respect to acids, that is not basic and desirably not hydrolyzable.

These liquids, although miscible with water, are not miscible with concentrated aluminum sulphate solution and I have discovered that the aluminum sulphate may be caused to precipitate with maximum purity and economy by adding sufficient sulphuric acid to cause the organic liquid to become completely miscible.

Under preferred conditions, the amount of sulphuric acid required for the purpose of miscibility, on the basis of the water present, may vary from about 0.5N to 10N, depending upon the nature of the organic liquid, the concentration of salt, and the temperature.

Although it is desirable to operate at elevated temperatures which permits the use of more concentrated solutions and higher purifications, the tendency toward immiscibility is very great at high temperatures.

By using sulphuric acid to cause miscibility with resultant precipitation of aluminum sulphate, I have been able to operate with concentrated, substantially saturated solutions of aluminum sulphate at elevated temperatures, for example in the neighborhood of the boiling point of the mother liquor.

Instead of sulphuric acid, other strong acids, such as hydrochloric or nitric acid, may be employed.

The preferred specific conditions and results vary to a considerable degree with the particular organic liquid that is used. Comparing a series of simple aliphatic alcohols such as methyl alcohol, ethyl alcohol and isopropyl alcohol, it is found that the purification under comparable conditions is slightly lower, the solubility of aluminum sulphate in the mother liquor is lower, the crystal size of the precipitate is larger, the viscosity of the suspension is smaller, and the amount of acid required for miscibility is greater, the greater the molecular weight of the alcohol. The filtration of the precipitate is easy for ethyl alcohol or isopropyl alcohol, but is relatively difficult for methyl alcohol because of the very fine crystals.

Acetone gives relatively large, platy crystals but the amount of sulphuric acid required for miscibility is relatively high and the purification is not as great as that effected by ethyl alcohol.

The organic liquid may consist of a pure compound, or of a mixture of compounds. The latter is often more available and more economical and may also give a better result. For example, a mixture of one volume of ethyl alcohol and one volume of isopropyl alcohol gave a better purification than isopropyl alcohol alone and as good as ethyl alcohol alone. At the same time, an improvement was effected over ethyl alcohol alone by the increase in crystal size and lower viscosity of the suspension.

The organic liquid may also contain small amounts of relatively insoluble compounds such as ethers, higher alcohols, ketones and aldehydes, etc.

Because of its availability, cheapness and efficacy, I prefer generally to use ethyl alcohol, or isopropyl alcohol, or a mixture of ethyl and isopropyl alcohols, although other suitable organic compounds may also be admixed. I shall hereafter refer therefore mostly to ethyl or isopropyl alcohol as the organic liquid, with the understanding that the conditions obtaining for ethyl or isopropyl alcohol apply substantially also to other water miscible, organic liquids.

After removal of the precipitated aluminum sulphate, the ethyl or isopropyl alcohol in the mother liquor may be recovered by distillation, or the mother liquor may be concentrated for reuse by addition of dehydrating agents, such as anhydrous aluminum sulphate, or by freezing out some of the water.

The aluminum sulphate solution is preferably concentrated, and in one desirable procedure should contain only that amount of water equivalent to its water of crystallization. The precipitation by alcohol is in the latter instance caused to take place under superatmospheric pressure at about 130° C. to 160° C.

The iron sulphate may desirably be in ferrous condition with the ferrous sulphate present at substantially below its saturation point in the mother liquor. This may be accomplished by previously calcining the aluminous material in a reducing atmosphere and/or by reducing ferric sulphate in the aluminum sulphate solution.

The sulphuric acid left in the mother liquor may be recovered after distilling off the alcohol by treatment of the residue of the distillation with additional strong sulphuric acid to precipitate the iron sulphate, and the filtrate of sulphuric acid so obtained may then be reused.

Presence of sulphuric acid in sufficient amount to render the alcohol miscible with the aluminum sulphate solution may be assured by using an excess of sulphuric acid in solubilizing the aluminum sulphate content of the aluminous material, and/or by adding sulphuric acid separately or together with the alcohol, or after the alcohol, to the aluminum sulphate solution.

The strength of the acid in the water present required to assure miscibility with the aluminum sulphate solution is greater for isopropyl than for ethyl alcohol, and depends upon the concentration of the salt and on the temperature, and practically may vary between about 0.5N and 4N. For example, with a 20% solution of aluminum sulphate at 60° C., miscibility with ethyl alcohol, and precipitation of aluminum sulphate, takes place when the acidity of the salt solution is greater than about 1.5N.

There is an obvious economic advantage in crystallizing the most concentrated, i. e., saturated, solutions of aluminum sulphate. These saturated solutions can also be crystallized at the highest temperatures, as is desirable, whereas less concentrated solutions will crystallize less readily at high temperatures due to increase in solubility with temperature.

It is possible to precipitate saturated solutions of aluminum sulphate without excessive thickening and excess use of alcohol by adding instead of straight alcohol, an aqueous solution of alcohol, or an aqueous sulphuric acid solution of alcohol, containing for example about 65% to 85% alcohol by volume. Because of the presence of water in the alcohol solution, the solubility of the aluminum sulphate is not too rapidly diminished during addition of the precipitant, and a uniform, fluid crystallization of aluminum sulphate takes place during the addition of the diluted alcohol, and the purification is very high.

In addition to its technical efficacy, the employment of diluted alcohol possesses two important economic advantages. Because of the fluidity of the suspension containing the precipitate, little or no alcohol need be added for thinning the suspension.

Secondly, the cost of recovering and recycling the water-alcohol is much less than for absolute or 95% alcohol, since in distilling the mother liquor, less refluxing is required in recovering an aqueous alcohol than a straight or 95% alcohol. Under my preferred conditions, little or no refluxing is required.

If the iron in solution is in the ferrous state, the purification may be improved. For example, with the iron content of the impure aluminum sulphate at 4% $Fe_2O_3$ (referred to $(Al_2O_3)$), the crystallized product employing ethyl alcohol as precipitant contained only 0.07% $Fe_2O_3$ when the iron was originally in the ferrous state as against 0.15% when it was in the ferric state, so that the purification effected was about twice as great.

Since ferrous sulphate is very much less soluble in aqueous alcohol than ferric sulphate, it is necessary that the quantity present be less than its saturation point in the mother liquor.

There are several advantages to precipitation at as high a temperature as possible. A much higher concentration of aluminum sulphate can be used because of the increase in solubility with temperature. The viscosity of the suspension is lower and mixing of the precipitant is more efficient. Crystal size is increased, resulting in improved filtration characteristics. Finally, a much purer product is obtained. At room temperature a reduction to 1/6 of the original iron oxide content was effected, as against a reduction to 1/30 its original content when crystallizing at about 80° C. and filtering at about 40° C.

The temperature effect applies also to filtration as well as to crystallization, the higher the temperature of filtration the purer the product.

However, a cold filtration is desirable from the standpoint of a higher yield of precipitated aluminum sulphate. With a mother liquor consisting of about 2 volumes of ethyl alcohol and 1 volume of about 2N sulphuric acid, the yield at 20° C. is about 98% and at 40° C. about 90%, and the yields are still higher with isopropyl alcohol.

A slower rate of cooling also tends to increase the yield by progressively overcoming supersaturation.

The purity of the product is improved and the crystal size coarsened by digesting the crystals at or near the boiling point of the mother liquor. When a product crystallized at 60° C. with ethyl alcohol was digested for about twenty minutes near the boiling temperature of 81.5° C., the per cent $Fe_2O_3$ in the precipitate was decreased from 0.38% to 0.22%. Likewise when a product crystallized at about 80° C. was digested at this temperature for twenty minutes, the per cent $Fe_2O_3$ was decreased from 0.25% to 0.18%.

The sulphuric acid necessary to assure miscibility may be present initially in the aluminum sulphate solution as a result of using sufficient excess of sulphuric acid to dissolve the alumina in the mineral. With saturated solutions of aluminum sulphate the solubility of the aluminum sulphate is, however, considerably decreased when the concentration of sulphuric acid is greater than about 0.5N, although a limited crystallization of the aluminum sulphate prior to the addition of the alcohol is not objectionable.

As a second method, the sulphuric acid may be added to the immiscible mixture of aluminum sulphate solution and alcohol resulting when the acid is not present in adequate amount to effect miscibility. In this case, if the temperature is sufficiently high and the stirring good, the added acid causes the two liquid layers to mix with one another, as desired, before any substantial crystallization in the presence of a double layer can take place.

The third and generally preferred method is to have present both in the salt solution and in the alcohol sufficient acid such that immiscibility is entirely avoided and crystallization proceeds regularly during the continued addition of precipitant consisting of a solution of alcohol, water and sulphuric acid.

As an example of my preferred mode of precipitation, one volume of an impure solution of aluminum sulphate in about 0.5N sulphuric acid, saturated at about 80° C. and containing about 39% $Al_2(SO_4)_3$, with some crystals initially present in the saturated solution, is stirred vigorously while being maintained at a temperature near to boiling point of the mother liquor, or about 80° C. to 84° C.

Then a hot alcohol solution at about the same temperature, consisting of about 1.2 to 1.7 volumes of ethyl alcohol, or isopropyl alcohol, or their mixture, and 0.3 to 0.4 volume of about 4N to 8N sulphuric acid, is slowly added to the aluminum sulphate solution.

After the addition, the suspension of aluminum sulphate crystals is preferably maintained at the precipitation temperature for a period of from 10 to 40 minutes, and the suspension is then cooled slowly in the course of one or two hours with stirring, to a low temperature of about 15° C. to 25° C.

The thick suspension of relatively coarse crystals is then filtered or centrifuged, the precipitate washed with aqueous alcohol, and dried.

According to this example, it is possible to separate on filtration at about 18° C. a product analyzing 0.18% $Fe_2O_3$ from an impure aluminum sulphate containing 4% $Fe_2O_3$ (referred to $Al_2O_3$). By filtering at a higher temperature of about 40° C. the iron content may be reduced to 0.12%, and if the iron is initially present as ferrous sulphate, it may be reduced to 0.06%.

The sulphuric acid may readily be recovered from the mother liquor by precipitating the ferric or ferrous sulphate with strong sulphuric acid. One volume of concentrated sulphuric acid is added to about one volume of the spent filtrate, which may preferably have been concentrated by evaporation. A crystalline precipitate of iron sulphate is obtained on standing, which may be decanted or filtered off.

The residual clear solution of sulphuric acid is very low in iron and may be reused for reaction with fresh bauxite, clay, or other aluminous mineral.

To illustrate the purification that may be obtained, on adding one volume of 66° Bé. sulphuric acid to one volume of ferric sulphate solution and allowing to stand for 24 hours at room temperature, the concentration of ferric sulphate in the solution was reduced to 0.34 mg. $Fe_2O_3$ per cc., which corresponds to better than a 90% reduction of the iron in the mother liquor of an impure aluminum sulphate containing 4% $Fe_2O_3$.

In the complete process, clay, bauxite, or other aluminous mineral, is preferably calcined at a temperature of about 400° C. to 800° C. and ground. When it is desired that the iron be in the ferrous state, the calcination may be carried out in a gaseous reducing atmosphere and/or by adding carbonaceous matter to the ore.

Even under normal calcination, some of the iron content of the clay may be present in the ferrous state.

The clay or bauxite is digested hot with about 30° Bé. to 50° Bé. sulphuric acid and is decanted and filtered hot to give a solution containing about 39% $Al_2(SO_4)_3$ and an acidity of 0.5N.

The aluminum sulphate of this solution is precipitated with alcohol or with other water miscible organic liquid, as described.

Two precipitations are usually preferred for a product of very high purity, although one may frequently be sufficient.

Assuming the former, the mother liquor of the first crystallization is distilled to recover the alcohol. The residual sulphuric acid may be discarded, or it may be treated for removal of iron, in which latter case the iron sulphate impurity may be calcined to recover the sulphur as sulphur dioxide and sulphur trioxide. The purified sulphuric acid solution obtained from the iron precipitation may be used for reaction with more clay or bauxite.

The aluminum sulphate resulting from the first crystallization is desirably washed with the saturated filtrate from the second crystallization, and the resultant wash solution, or part of it, may be concentrated with respect to its alcohol content for use as precipitant in the first crystallization.

The washed product of the first crystallization may be redissolved, and recrystallized with fresh alcohol resulting from distillation of the mother liquor.

The product of the second and final crystallization is dried, dehydrated and calcined to produce alumina. The sulphur escapes as a mixture of sulphur dioxide and sulphur trioxide which are condensed to give concentrated sulphuric acid, and the concentrated acid is used over again in the process.

Starting with a low grade Arkansas bauxite and an Alabama clay, calcined in an oxidizing atmosphere, and twice precipitating with ethyl alcohol the aluminum sulphate solution prepared therefrom, the products of alumina which I have obtained by calcination have by direct spectroscopic comparison been found to be purer than the high-grade alumina of an alkaline process digesting low-silica bauxite with caustic soda. The products each contained 0.02% $SiO_2$, and that from the bauxite contained 0.012% $Fe_2O_3$, while that from the clay contained 0.0055% $Fe_2O_3$. No $Na_2O$ or $K_2O$ could be detected in either, and the sum of CaO and MgO totaled only about 0.1% in each case.

The $SiO_2$ content of the products is very low, but if desired a further purification with respect thereto could be effected by suitable drying of the first crystallization product before its resolution and re-crystallization, where two crystallizations are desirable.

Having thus described my invention, I claim as new:

1. A process of producing pure aluminum sulphate from a crude solution of aluminum sulphate which comprises adding sulfuric acid thereto, making the resultant solution saturated with respect to aluminum sulphate at about 80° C., with crystals of aluminum sulphate present in the saturated solution, maintaining said solution at about 80° C., adding to said solution an aqueous solution of ethyl alcohol the alcohol being about 65% to 85% by volume in order to yield a fluid mass during crystallization and for ease of recovery of the alcohol, said alcohol being also at about 80° C., stirring said solution and said alcohol together, crystallizing aluminum sulfate from the resulting solution while cooling, and separating the crystals of pure aluminum sulphate from the cooled impure mother liquor.

2. A process of producing pure aluminum sulphate from a hot concentrated crude solution of aluminum sulphate which comprises adding sulphuric acid thereto in the range from about five-tenths to ten normal, adding to the resultant solution a water miscible organic liquid which is inert to acid and in which aluminum sulphate is relatively insoluble, adding sulphuric acid thereto, crystallizing aluminum sulphate from the resulting mixture, and separating the crystals of pure aluminum sulphate from the impure mother liquor.

3. A process of producing pure aluminum sulphate from a hot concentrated crude solution of aluminum sulphate which comprises adding sulphuric acid thereto, adding acetone to the resultant solution, said acetone being at an elevated temperature approximately equal to that of said solution, stirring said solution and said acetone together at the elevated temperature adding mineral acid thereto, crystallizing aluminum sulphate from the resulting solution while cooling, and separating the crystals of pure aluminum sulphate from the cooled impure mother liquor.

4. A process of producing pure aluminum sulphate from a hot concentrated crude solution of aluminum sulphate of at least 20% concentration and at a temperature of at least 60° C. containing free mineral acid and iron salt in the ferrous state which comprises, adding to the solution an aqueous solution of ethyl alcohol, crystallizing aluminum sulphate from the resulting mixture while cooling, and separating the crystals of pure aluminum sulphate from the impure mother liquor.

5. A process of producing pure aluminum sulphate from a crude solution of aluminum sulphate containing free mineral acid which comprises mixing a hot concentrated solution thereof of at least 20% concentration and at a temperature of at least 60° C. and an aqueous solution of ethyl alcohol, the concentration of free acid being sufficient to promote miscibility and resultant crystallization at a temperature of at least 60° C., cooling the solution while crystallizing aluminum sulphate, and separating the crystals of pure aluminum sulphate from the cooled impure mother liquor.

6. A process of producing pure aluminum sulphate from a crude solution of aluminum sulphate containing free mineral acid which comprises mixing a hot concentrated solution thereof of at least 20% concentration and at a temperature of at least 60° C. and an aqueous solution of ethyl alcohol, the concentration of free acid being sufficient to promote miscibility and resultant crystallization at a temperature of at least 60° C., digesting the resulting mixture of crystals and liquid at a temperature above the temperature of mixing, cooling the resulting mixture while crystallizing aluminum sulphate, and separating the crystals of pure aluminum sulphate from the cooled impure mother liquor.

7. A process of producing pure aluminum sulphate from a crude solution of aluminum sulphate containing free mineral acid which comprises mixing a hot concentrated solution thereof of at least 20% concentration and at a temperature of at least 60° C. and an aqueous solution of about 65 to 85% ethyl alcohol, by volume in order to yield a fluid mass during crystallization and for ease of recovery of the alcohol, cooling the resulting mixture while crystallizing aluminum sulphate, and separating the crystals of pure aluminum sulphate from the cooled impure mother liquor.

8. A process of producing pure aluminum sulphate from a crude solution of aluminum sulphate containing free sulphuric acid, which comprises making said solution saturated at an elevated temperature above 60° C. with respect to aluminum sulphate and causing crystals of aluminum sulphate to be present in the saturated solution thereby forming a suspension, mixing the suspension with an aqueous solution of about 65 to 85% ethyl alcohol, by volume in order to yield a fluid mass during crystallization and for ease of recovery of the alcohol, cooling the mixture while crystallizing aluminum sulphate, and separating the crystals of pure aluminum sulphate from the cooled impure mother liquor.

9. A process of producing pure aluminum sulphate from a crude solution of aluminum sulphate containing free sulphuric acid, which comprises making said solution saturated at an elevated temperature above 60° C. with respect to aluminum sulphate and causing crystals of aluminum sulphate to be present in the saturated solution thereby forming a suspension, mixing the suspension with an aqueous solution of about 65 to 85% ethyl alcohol and isopropyl alcohol, by volume in order to yield a fluid mass during crystallization and for ease of recovery of the alcohol, cooling the mixture while crystallizing aluminum sulphate, and separating the crystals of pure aluminum sulphate from the cooled impure mother liquor.

10. A process of producing pure aluminum sulphate from a crude solution of aluminum sulphate containing free mineral acid which comprises mixing a hot concentrated solution thereof of at least 20% concentration and at a temperature of at least 60° C. and an aqueous solution of a water miscible aliphatic alcohol, the concentration of free acid being sufficient to promote miscibility and resultant crystallization at a temperature of at least 60° C., cooling the solution while crystallizing aluminum sulphate, and separating the crystals of pure aluminum sulphate from the cooled impure mother liquor.

11. A process of producing pure aluminum sulphate from a crude solution of aluminum sulphate containing free mineral acid which comprises mixing a hot concentrated solution thereof of at least 20% concentration and at a temperature of at least 60° C. and an aqueous solution of ethyl alcohol and isopropyl alcohol, the concentration of free acid being sufficient to promote miscibility and resultant crystallization at a temperature of at least 60° C., cooling the solution while crystallizing aluminum sulphate, and separating the crystals of pure aluminum sulphate from the cooled impure mother liquor.

12. A process of producing pure aluminum sulphate from a crude solution of aluminum sulphate containing free mineral acid which comprises mixing a hot concentrated solution thereof of at least 20% concentration and at a temperature of at least 60° C. and an aqueous solution of ethyl alcohol containing free mineral acid, the total concentration of free acid being sufficient to promote miscibility and resultant crystallization at a temperature of at least 60° C., cooling the solution while crystallizing aluminum sulphate, and separating the crystals of pure aluminum sulphate from the cooled impure mother liquor.

13. A process of preparing pure aluminum sulphate which comprises treating an aluminous mineral with sulphuric acid such that the resultant crude solution of aluminum sulphate contains an excess of sulphuric acid, causing the solution to be saturated with respect to aluminum sulphate at a temperature of at least 60° C., adding thereto an aqueous solution of ethyl alcohol containing between about 65% to 85% ethyl alcohol by volume, the concentration of free sulphuric acid being sufficient to promote miscibility and resultant crystallization at a temperature of at least 60° C., cooling the solution while crystallizing aluminum sulphate, and separating the crystals of pure aluminum sulphate from the cooled impure mother liquor.

PAUL S. ROLLER.